Jan. 20, 1953        R. E. KLAGES        2,625,736
METHOD OF MAKING A TWO-PART BALL CONSTRUCTION
Filed April 1, 1946
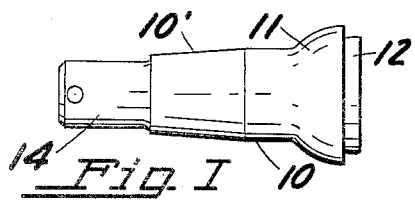
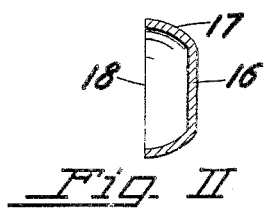
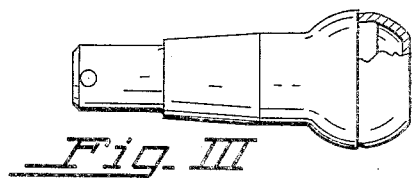
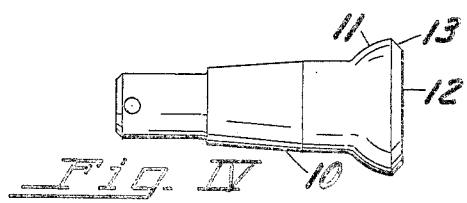
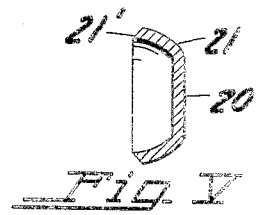
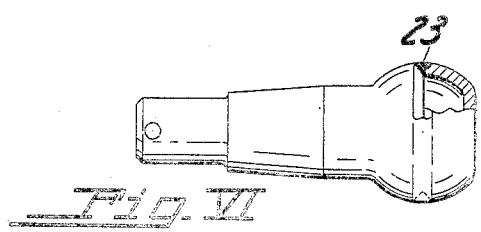
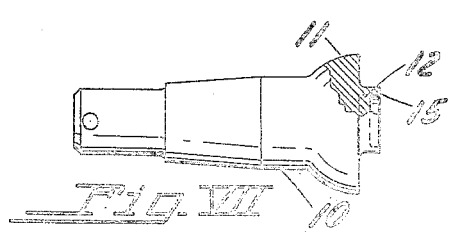
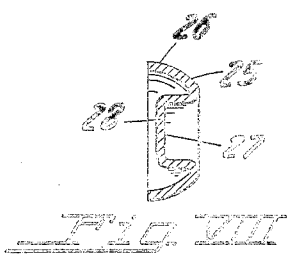
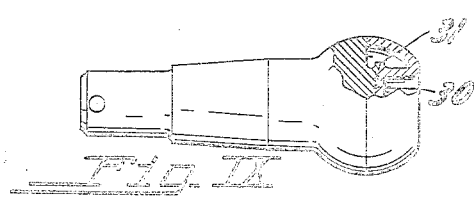
Reynold E. Klages
INVENTOR.
BY Edmund B. Whitcomb
Attorney Patented Jan. 20, 1953

2,625,736

UNITED STATES PATENT OFFICE 2,625,736

METHOD OF MAKING A TWO-PART BALL CONSTRUCTION

Reynold E. Klages, Columbus, Ohio, assignor to The Columbus Auto Parts Company, Columbus, Ohio, a corporation of Ohio Application April 1, 1946, Serial No. 658,775

1 Claim. (Cl. 29—148)

The present invention relates to the construction of a two part ball having a wide variety of uses, but particularly adaptable for use in universal joints—and more specifically forming an excellent ball stud construction for a joint in a tie rod and drag link assembly.

One object of the present invention is to effect certain economies in manufacture, since it has been discovered that by making one part a solid half ball (which can be economically cold headed as the stock has sufficient volume per unit of length for this purpose, although insufficient to form a full solid ball), then forming a hollow cooperating portion in a relatively cheap manner—as by stamping, coining, et cetera, and thereupon joining the two parts together, either mechanically or by electric welding, the result is that a very satisfactory full ball construction is produced at a much lower cost than that required to make a full solid ball of the same dimensions. Moreover, the two-part ball produced affords substantially the same value as a solid one-piece ball from the standpoint of wear and practicability.

Another object is to provide a two part ball of the type indicated, having certain novel characteristics inherent in its construction.

A further object of the present invention is to provide a two-part ball construction of a type in which both portions may be independently hardened and the two properly welded or mechanically connected without further processing or, in case of welding, without drawing the temper on the bearing surface of the ball contact parts during the welding. Moreover, by this arrangement it is unnecessary to remove any welding flash.

Further objects and advantages are within the scope of this invention such as relate to the arrangement, operation, and function of the related elements of the structure, to various details of construction and to combinations of parts, elements per se, as well as the economies of manufacture and numerous other features as will be apparent from a consideration of the specification and drawing of certain forms of the invention, one of which may be preferred, in which:

Figure I is a side elevation of the solid half ball part of one embodiment of the construction;

Figure II is a central, vertical section of a stamping for forming the other half of the ball;

Figure III is a side elevational view, partly in section, showing the two parts rolled or clinched together;

Figure IV is a view similar to Figure I of a modification; and

Figure V is a section of a cooperating piece to be welded to the part shown in Figure IV;

Figure VI is an elevational view, partly in section, showing the two parts of Figures IV and V ring welded together;

Figure VII is a side elevational view, partly in section, of a further modification of one-half of a two-part ball and ball stud;

Figure VIII is a sectional view of a cupped metal cooperating half of a ball; and Figure IX is an elevational view, partly in section, showing the two parts of Figures VII and VIII butt welded together.

Referring to the embodiment of the invention illustrated in Figures I, II, and III, it will be seen that there is illustrated at 10, a solid one-piece stud and half ball construction having a stud or shank 10', and an integral, spherical, seat bearing, finished surface 11 with a central, forwardly extending portion 12 connected thereto. Since the size of the stock or wire used in making the stud is determined by the smallest diameter as indicated at 14 and since 4½ diameters of wire is the practical limit of wire or stock that can be headed in two blows, the ball and stud 10, with the spherical surface 11 and central extension 12 not being a full, but only a half ball, is reduced in volume so that it can be economically made on a two blow cold heading machine.

In Figure II, I have illustrated the other half of the ball shown in this embodiment as a stamping 16 formed with an external spherical seating portion 17 to cooperate with, correspond to, and form an extension of the spherical portion 11 of the solid portion 10. It will be noted that the lower rim 18 of the section 16 is somewhat larger than the diameter of the ball 11 at the equator thereof so that when the cup section 16 is applied over the extension 12, the lower edge portion of rim 18 may be rolled or clinched down tight on the flange 12, thus uniting the two pieces 10 and 16 into one unitary ball which has substantially a continuous outside spherical shape of the desired size and configuration.

In the embodiment illustrated in Figures IV, V, and VI, the half ball and stud unit 10 is made substantially as in Figure I with a bevelled face 13 on the extension 12. Here, however, the cooperating hollow metal part 20, having a spherical seat portion 21 corresponding to or coextensive of the spherical portion 11 of the solid half ball on the stud, is cut away as indicated at an angle as at 21' at the outside edge thereof so that when the two parts are joined together, a ring weld 23 illustrated in Figure VI may be suitably received at the joining edges and thus employed to suitably join the two parts 10 and 20 into a contiguous whole. As shown in Figure IV, it is noted that the bevel 13 of the extension 12 cooperates with the edge 21 of the ball part 20 to facilitate the ring welding operation referred to.

In Figures VII, VIII, and IX, is illustrated a still further embodiment of the present invention. In this case the unit 10 has the half ball surface 11 as before with the extension 12 provided with an outwardly extending rim or flange 15 adapted to cooperate in the butt welding operation utilized in this embodiment. To this end, the stamped out or otherwise formed cooperating hollow unit 25 of the ball is formed with an outside spherical surface 26 and an inwardly cupped portion 27 providing a flat bottom face 28 adapted to fit against the rim 15 and extension 12 whereupon the two parts are butt welded together, as indicated at 30 in Figure IX. In this embodiment, it will be noted that the two parts 10 and 25 may be separately completely finished and hardened and that by uniting the two parts by a butt weld, as indicated, the heat developed will not draw the temper from the finished bearing spherical surface 11 and 26 nor is it necessary to remove any welding flash in this case, as the flash is located on the inside of the hollow portion of the ball as indicated at 31.

It is apparent that, within the scope of the invention, modifications and different arrangements may be made other than is herein disclosed, and the present disclosure is illustrative merely, the invention comprehending all variations thereof.

What I claim is:

In a method of making the ball part for a ball joint assembly having a solid integral stud and half ball unit with a maximum diameter of the ball part for a given stud, providing a cylindrical stock of material of a diameter substantially the minimum diameter of a portion of the stud shank and the length of that portion of said stock provided for formation into said stud and half ball unit being such that the volume is approximately four and a half times said diameter of the cylindrical stock to have sufficient volume per unit of length to make a joint unit with a combined integral stud having a maximum-sized solid half ball and an integral central extending portion thereon; completely shaping the unit to form a solid half ball integral with the shank by cold heading said stock with two blows in a cold heading machine; providing simultaneously therewith an interconnecting shoulder thereon; forming a separate hollow cooperating ball part complementary to said first one half ball part; assembling the two parts; and finally permanently connecting the rim of the hollow part to said shoulder of the stud and one half ball part.

REYNOLD E. KLAGES.

REFERENCES CITED

The following references are of record in the file of this patent:

UNITED STATES PATENTS

| Number | Name | Date |
| --- | --- | --- |
| 71,450 | Butter | Nov. 26, 1867 |
| 1,292,037 | Pfanstiehl | Jan. 21, 1919 |
| 1,559,402 | Boardman | Oct. 27, 1925 |
| 1,714,661 | Crawford | May 28, 1929 |
| 1,775,055 | Tarbox et al. | Sept. 2, 1930 |
| 1,825,005 | Longhead | Sept. 29, 1931 |
| 1,842,571 | Sebell | Jan. 26, 1932 |
| 2,141,753 | Hufferd et al. | Dec. 27, 1938 |
| 2,265,839 | Hufferd et al. | Dec. 9, 1941 |
| 2,280,634 | Flumerfelt | Apr. 21, 1942 |
| 2,319,235 | Hothersall | May 18, 1943 |
| 2,324,055 | Bahelka | July 13, 1943 |
| 2,429,293 | Peck et al. | Oct. 21, 1947 |